US007352895B2

(12) United States Patent
Speigle et al.

(10) Patent No.: US 7,352,895 B2
(45) Date of Patent: Apr. 1, 2008

(54) SYSTEMS AND METHODS FOR ILLUMINANT MODEL ESTIMATION

(75) Inventors: Jon M. Speigle, Vancouver, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 726 days.

(21) Appl. No.: 10/728,573

(22) Filed: Dec. 5, 2003

(65) Prior Publication Data

US 2005/0069200 A1 Mar. 31, 2005

Related U.S. Application Data

(63) Continuation-in-part of application No. 10/677,034, filed on Sep. 30, 2003, now Pat. No. 7,064,769, which is a continuation-in-part of application No. 10/676,306, filed on Sep. 30, 2003, which is a continuation-in-part of application No. 10/677,009, filed on Sep. 30, 2003.

(51) Int. Cl.
*G06K 9/00* (2006.01)
*G09G 5/02* (2006.01)
(52) U.S. Cl. .................. 382/162; 345/589
(58) Field of Classification Search ............... 382/162; 345/589–605; 348/453
See application file for complete search history.

(56) References Cited

U.S. PATENT DOCUMENTS 4,648,051 A 3/1987 Wandell et al. ............ 382/162
4,992,963 A 2/1991 Funt et al. ................. 382/162
6,038,339 A 3/2000 Hubel et al. ............... 382/162
6,243,133 B1 6/2001 Spaulding et al. ....... 348/223.1
6,249,601 B1 * 6/2001 Kim et al. .................. 382/162
2003/0021472 A1 * 1/2003 Nichogi et al. ............ 382/166

OTHER PUBLICATIONS

Finlayson et al., Finlayson, G. D. Hordley, S. D., Hubel, P. M. "Color by correlation: a simple, unifying framework for color constancy," IEEE Trans. Pattern Analysis and Machine Intelligence, vol. 23, pp. 1209-1221, 2001.*
Brainard et al., David H. Brainard, William T. Freeman, "Bayesian color constancy", vol. 14 No. 7/ Jul. 1997/ Journal of Optical Society of America, pp. 1393-1411.*
Buchsbaum, G. "A Spatial Processor Model for Object Color Perception," J. Franklin Inst., vol. 310, 1980.
Maloney, L.T.; Wandell, B.W. "Color Constancy: a method for recovering surface spectral reflectance", J. Optical Soc. Am. A, vol. 3, pp. 29-33, 1986.

(Continued)

*Primary Examiner*—Matthew C. Bella
*Assistant Examiner*—Randolph Chu
(74) *Attorney, Agent, or Firm*—Krieger Intellectual Property; Scott C. Krieger

(57) ABSTRACT

Elements of the present invention relate to methods and systems for estimating an image illuminant model. In some embodiments, color gamut models for a plurality of candidate illuminants are calculated and compared to an image color gamut by determining a distance match metric for each of the candidate illuminants with reference to the image color gamut. An image illuminant may then be selected from the plurality of candidate illuminants based on the distance match metric.

15 Claims, 3 Drawing Sheets

Match surfaces for 81 sample illuminants under different metrics.

OTHER PUBLICATIONS

Brainard, D.H.; W. T. "Bayesian color constancy," J. Optical Soc. Am. A, vol. 14, pp. 1393-1411, 1997.

Finlayson, G.D.; Hordley, S.D.; Hubel, P.M. "Color by correlation: a simple, unifying framework for color constancy," IEEE Trans. Pattern Analysis and Machine Intelligence, vol. 23, pp. 1209-1221, 2001.

Finlayson, G.D. Hordley, S.D.; Hubel, P.M. "Unifying color constancy," J. Imaging Science and Technology, vol. 45, pp. 107-116, 2001.

Luo, Jiebo; Etz, Stephen "A Physical Model-Based Approach to Detecting Sky in Photographic Images," IEEE Transaction on Image Processing, vol. 11, No. 3, pp. 201-212, Mar. 2002.

Maloney, L. T., "Physics-Based Approaches to Modeling Surface Color Perception", 2002.

Finlayson, G.D., Color In Perspective, IEEE PAMI, 1996, pp. 1034-1038.

Forsyth, D.A., A Novel Approach to Color Constancy, ICCV88, pp. 9-18, 1988.

Swain, M.J. and Ballard, D.H., Color Indexing, IJCV(7), No. 1, Nov. 1991, pp. 11-32.

Rubner, Y., Tomasi, C. and Guibas, L., The Earth Movers Distance as a Metric for Image Retrieval, Technical Report STAN-CS-TN-98-86, Stanford Computer Science Department, Sep. 1998.

* cited by examiner

Example grid of 81 illuminants in x-y chromaticity coordinates

| | | | | |
|---|---|---|---|---|
| | ⋮ | | | |
| 5 | 6 | ⋰ | | |
| 2 | 4 | 7 | | |
| 1 | 3 | 8 | ⋯ | |

| | | | | |
|---|---|---|---|---|
| | ⋮ | | | |
| 6 | | ⋰ | | |
| 2 | 5 | | | |
| 1 | 3 | 4 | ⋯ | |

| | | | | |
|---|---|---|---|---|
| | ⋮ | | | |
| $2m+1$ | | ⋰ | | |
| $m+1$ | $m+2$ | | | |
| 1 | 2 | 3 | ⋯ | $m$ |

Figure 2

Match surfaces for 81 sample illuminants under different metrics.

SYSTEMS AND METHODS FOR ILLUMINANT MODEL ESTIMATION

RELATED CASES

The present application is a continuation-in-part of the following three applications:

U.S. patent application Ser. No. 10/677,034, entitled Systems and Methods for Computing the Presence of Self-Luminous Elements in an Image, invented by Jon M. Speigle and John E. Dolan, filed on Sep. 30, 2003, now U.S. Pat. No. 7,064,769;

U.S. patent application Ser. No. 10/676,306, entitled Systems and Methods for Correcting Image Color Balance and, invented by Jon M. Speigle and John E. Dolan, filed on Sep. 30, 2003; and U.S. patent application Ser. No. 10/677,009, entitled Systems and Methods Illuminant Estimation, invented by John E. Dolan and Jon M. Speigle, filed on Sep. 30, 2003.

TECHNICAL FIELD

The present invention relates generally to digital image processing and more particularly to methods and systems for estimation of an image illuminant model.

BACKGROUND

Colors viewed in an image are dependent on the light that illuminates the subject of the image. Different illuminants will lead to differences in reflected light from the surfaces of the image subject matter. The human visual system approximately corrects these differences in reflected light so that perceived surface color is approximately constant. However, when images are captured on media and viewed under a light source different than the source in the image scene, these natural corrections do not take place. Accordingly, it may be preferable for recorded images to be color-balanced to a standard, reference light source in order to appear as they would to the natural eye. This balancing or color correction can be performed once the scene illuminant is identified.

Under known methods, illuminant estimation employs a fixed set of known illuminants, which are each characterized by the gamut of chromaticities that are possible under that illuminant. A chromaticity histogram may be computed for the image and compared with model histograms

SUMMARY

Embodiments of the present invention provide methods and systems for image illuminant estimation by model matching with distance metrics.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

Figure 2:
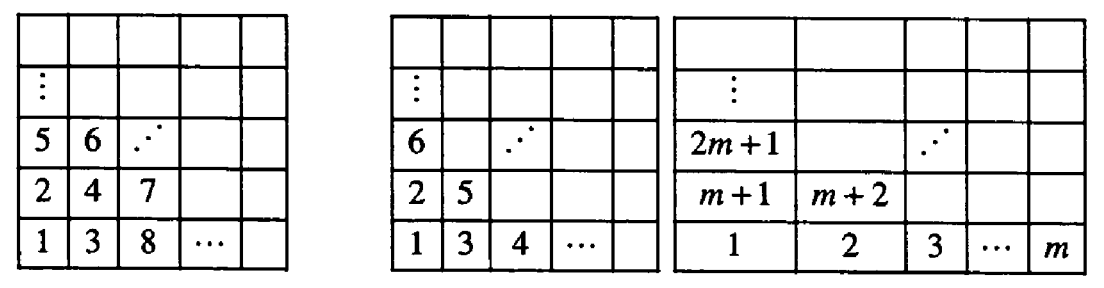

FIG. 2 is a diagram of an exemplary ordering scheme; and

DETAILED DESCRIPTION

Illuminant estimation may be approached through a model matching strategy. In such a regime, a fixed set of illuminants is modeled. Modeling may be performed parametrically, by sample statistics or by other methods. The model that best accounts for the image data is chosen as the scene illuminant most likely to have produced the image. This decision process relies on computing a similar parametric or statistical description from the image and then performing a matching procedure of the image description with respect to the model base in order to select the "best" model.

Figure 1:
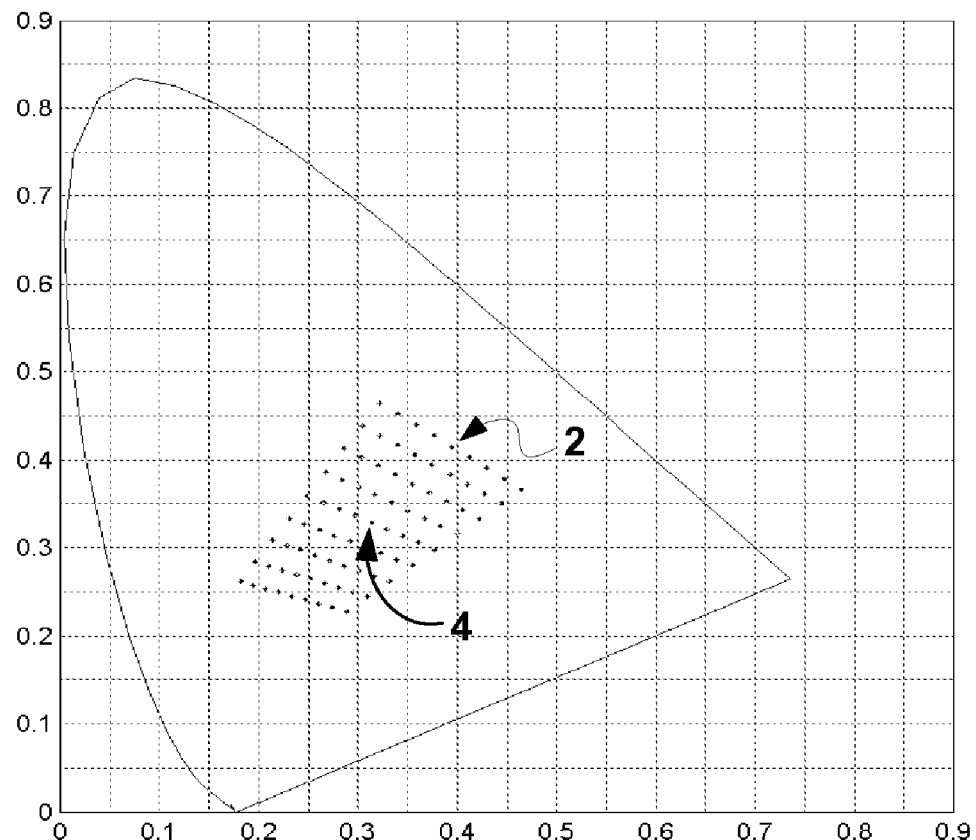
FIG. 1 is a diagram illustrating a set of candidate illuminants as x-y chromaticity coordinates.

An exemplary model set, shown in FIG. 1, consists of 81 illuminants plotted in x-y chromaticity space. Chromaticity coordinates are shown as dots 2. In this particular example, these coordinates have been regularly sampled in CIE-Lab coordinates centered on the D65 white point 4, which is a daylight reference illuminant. The coordinates are then mapped to x-y chromaticity space as displayed in FIG. 1. In a similar fashion, the pixels of the input image may be transformed to CIE-xyY space (which is the x-y chromaticity space together with luminance information).

In other embodiments, color values may be represented in an alternative colorspace or other chromaticity space such as $r=R/(R+G+B)$ $g=G/(R+G+B)$ $b=B/(R+G+B)$ In some embodiments of the present invention a distance metric may be used to determine which model best matches the image illuminant. The term "distance" is usually used to describe a length in space, such as the length of a line segment in two- or three-dimensional space. However, in this document, the term distance may also refer to a similar metric in a space with more than three dimensions. The term distance may also refer to a difference between two values that can be represented as points in multi-dimensional space.

A measure $d(x, y)$ is a distance metric iff (if and only if) it satisfies the following 3 conditions:

1. $d(x, y)=0$ iff $x=y$ [zero only for equality]
2. $d(x, y)=d(y, x)$ [symmetry]
3. $d(x, y)+d(y, z)<=d(x, z)$ [triangle inequality]

It is usual (but often implicit) to add the condition of non-negativity—i.e., $d(x, y)>=0$ for all $x, y$.

A distance metric may also be referred to as a difference metric or a dissimilarity metric. In this specification and claims the terms distance, difference and dissimilarity are synonymous.

Some embodiments of the present invention may perform operations on a subset of the full model set. The full model set may be pared down to a subset through an initial selection process. Final illuminant selection will then take place within the subset of models.

In other embodiments, evaluations can also be performed in greedy fashion. The following is an example of greedy evaluation:

a) Evaluate a first best guess model as the prior value b) Evaluate a second best guess model as the current value c) Compute the difference vector between the current and prior values d) While the difference vector is decreasing and greater than a criterion magnitude
   i) Set the prior value to the minimum of prior and current values
   ii) Evaluate a new best guess as the current value. Typically, the difference vector is used to guide the choice of the new model.
   iii) Compute the difference in scores between the prior and current values In embodiments of the present invention, it is possible to use any element-by-element vector distance/difference/dissimilarity measure. Such measures are appropriate for vectors or distributions on the same space.

In some embodiments, distances under Minkowski norms such as L1, L2, L∞ may be used as a metric. These parameters may be expressed in equation form as follows:

$$d_{L1}(x, y) = \sum |x_i - y_i|$$
$$d_{L2}(x, y) = \left(\sum (x_i - y_i)^2\right)^{1/2}$$
$$d_{L\infty}(x, y) = \max |x_i - y_i|$$

In other embodiments of the present invention, a Chi-squared statistical difference may be used as a metric. This difference metric may be expressed in equation form as follows:

$$d_\chi(x, y) = 2\chi^2 = \sum \begin{cases} \frac{(x_i - y_i)^2}{x_i + y_i} : & x_i + y_i \neq 0 \\ 0 : & x_i + y_i = 0 \end{cases}$$

In still other embodiments a Jeffrey divergence metric may be used. This metric may be expressed in equation form as follows:

$$d_J(x, y) = \sum \begin{cases} x_i \log \frac{2x_i}{x_i + y_i} + y_i \log \frac{2y_i}{x_i + y_i} : & x_i + y_i \neq 0, x_i \cdot y_i \neq 0 \\ x_i \log 2 : & x_i \neq 0, y_i = 0 \\ y_i \log 2 : & x_i = 0, y_i \neq 0 \\ 0 : & x_i + y_i = 0 \end{cases}$$

Because of the log function, this measure is appropriate only when the vector elements are positive (i.e., $x_i > 0$). This non-negative condition holds for frequency vectors such as color histograms.

In still other embodiments of the present invention, it is also possible to use non element-by-element distance/difference/dissimilarity measures. With such measures there may be a cost associated with matching non-corresponding elements—sometimes referred to as the ground distance—and this cost is added to the difference computed between the non-corresponding elements. Thus, the distance between two arbitrary elements of two vectors $x_i \in X$ and $y_j \in Y$ depends both on the functional difference in the elements (e.g., $\|x_i - y_j\|$) and the difference between i and j.

In some of these embodiments, a quadratic form metric can be used. This metric can be expressed in equation form as follows:

$$d_Q(x, y) = \sqrt{(x-y)^T Q(x-y)}$$

where the quadratic form is a similarity transform—i.e., $Q = Q^T$ and $Q^T Q = Q Q^T = I$. Elements of $Q = \lfloor q_{ij} \rfloor$ encode the normalized ground distances between elements: $q_{ij} = 1 - d_{ij}/d_{max}$. Note that in the case that Q=I, this distance reduces to the Euclidean (L2) distance.

In still further embodiments, a cumulative match distance may be used. This metric may be expressed in equation form as follows:

$$d_M(x,y) = \Sigma |\hat{x}_i - \hat{y}_i|$$

where $$\hat{x}_i = \sum_{j \leq i} x_j$$

denotes the cumulative histogram of x up to cell i and similarly for y. Note that this can generalize to multidimensional distributions as follows:

$$x_{mnp} = \sum_{i \leq m} \sum_{j \leq n} \sum_{k \leq p} |x_{ijk} - y_{ijk}|.$$

In other embodiments a projective match distance may be used as a metric. This metric may be expressed in equation form as follows:

$$d_{PM}(x,y) = \Sigma |\tilde{x}_i - \tilde{y}_i|.$$

Here $$\tilde{x}_i = \sum_{j \leq i} x_j$$

is the cumulative sum of x up to cell i after projecting the possibly multidimensional histogram to a one dimensional structure—i.e., by imposing a total ordering on the histogram bins. Strictly speaking this is NOT the cumulative distribution, except in the case that the histogram is originally one dimensional. Ordering schemes include distance (L1, L2, ... ) from the origin, zig-zag, row or column major, etc. Some examples are shown in FIG. 2. Note that this measure may be an approximation to the cumulative distance (discussed above) and one that is more efficient to compute. It is important and obvious that the same ordering should be imposed on both histograms.

Additional illuminant estimation complexity occurs when an image contains non-reflective or self-luminous objects that do not directly reflect light from an illuminant. Conventional correction algorithms assume that all image pixels represent reflecting surfaces. When an image contains self-luminous objects such as sky and other light sources the surface-pixel assumption is violated. When an image contains a significant portion of non-reflective, self-luminous objects, conventional methods will fail and the image illuminant will be incorrectly determined. For example, if an image contains blue sky and the color-balance algorithm assumes that all pixels are reflecting objects, "bluish" pixels could be taken as evidence that the illumination of the scene is bluish. Because a color correction is approximately the opposite hue of the estimated illuminant, the correction for a bluish illuminant would be to shift the image in a yellowish direction. This correction might produce an overly yellowish ground/surface region and a desaturated sky region.

These color correction, color balance or color constancy algorithms generally do not address the question of how to handle images containing luminous objects, which are also referred to herein as self-luminous objects. They have, rather, focused on images where the surface-pixel assumption is satisfied (e.g., uniformly illuminated Mondrian-like images).

In some embodiments of the present invention, for each pixel, image element or image area, a function is computed that estimates the probability p that the pixel, element or area corresponds to a reflective surface—i.e., the probability that it is not self-luminous. This is necessary because nearly all illuminant estimation procedures assume that the image pixels are a product of the illuminant reflecting from surfaces in the scene. So, incorporating self-luminous pixels would invalidate the estimate. Note that this computation is unnecessary for the model histograms, because these histograms are by definition constructed only from data that corresponds to reflective surfaces.

The value computed by this function may be used to increment the accumulator of the corresponding histogram bin $(\bar{x},\bar{y})$, and the function has the following form:

$$\phi(x,y,Y,r,c) \mapsto (\bar{x},\bar{y},p).$$

Some of these functions may be defined on a 5-tuple consisting of 2 chromaticity values x, y; 1 luminance value Y; and 2 image position values r, c, corresponding to row and column positions. It may return a 3-tuple consisting of the corresponding histogram bin indices $(\bar{x},\bar{y})$ and the bin increment, p. (Note that, in some embodiments, p ranges on the interval (0 . . . 1); it will be 0 for pixels corresponding to non-reflective objects and 1 only for pixels corresponding to reflective surfaces.)

Details of embodiments of these functions are explained in detail in separate, previously-filed patent applications: U.S. patent application Ser. No. 10/677,034, entitled Systems and Methods for Computing the Presence of Self-Luminous Elements in an image, invented by Jon M. Speigle and John E. Dolan, filed on Sep. 30, 2003 and now issued as U.S. Pat. No. 7,064,769, issued on Jun. 20, 2006; U.S. patent application Ser. No. 10/676,306, entitled Systems and Methods for Correcting Image Color Balance and, invented by Jon M. Speigle and John E. Dolan, filed on Sep. 30, 2003; and U.S. patent application Ser. No. 10/677,009, entitled Systems and Methods Illuminant Estimation, invented by John E. Dolan and Jon M. Speigle, filed on Sep. 30, 2003, which are hereby incorporated by reference into this application.

In other embodiments where the image color histogram is computed over three or more dimensions, the function estimating the probability that the pixel element or area corresponds to a reflective surface would accept arguments of the color coordinates and pixel coordinates.

In other embodiments the function estimating probability of an element or area corresponding to a reflective surface would operate on a neighborhood of image pixel elements.

In some of these embodiments, a histogram encodes the amount of evidence in the image for the presence of each chromaticity originating from a reflective surface.

In some embodiments of the present invention, the image histogram is matched to the model histograms and the best match illuminant is selected. The match metric used in some embodiments is the chi-squared statistic, which is a procedure to test the variance of a sample population against an underlying population. In embodiments of the present invention, the image may represent a sample population and an illuminant model may be represented as the hypothesized underlying population. One form of this relationship may be formulated as follows:

$$\chi^2 = \sum_{\substack{all \\ cells}} \frac{(\text{observed} - \text{expected})^2}{\text{expected}}. \quad (1)$$

This measures the normalized squared difference between an image (observed) and the illuminant models (expected). In terms of measuring the difference between image histogram h and a model histogram m, the measure can be reformulated as a bin-by-bin operation as follows:

$$\chi^2(h,m) = \sum_i \frac{(h_i - \mu_i)^2}{\mu_i}, \text{ with } \mu_i = \frac{h_i + m_i}{2}.$$

Here $h_i$ and $\mu_i$ are respectively the measured image histogram value and the expected value for the i'th bin, where the expected value is defined simply as the average of the corresponding image and model values. After substituting for $\mu_i$ and eliminating constants, the expression to be minimized over all models is simply:

$$\min \chi^2 = \sum_i \frac{(h_i - m_i)^2}{h_i + m_i}. \quad (2)$$

This match metric is computed for each model, and the illuminant that produces the minimum value of this function is taken to be the best match illuminant for the image data. In terms of equation (1), it is the illuminant that minimizes the difference between the observed values in the image and the values expected under the illuminant. In rough statistical terms, as the value of this $\chi^2$ metric decreases, the percentage of data supporting the hypothesis that the corresponding model is the true illuminant of the scene increases.

Figure 3:
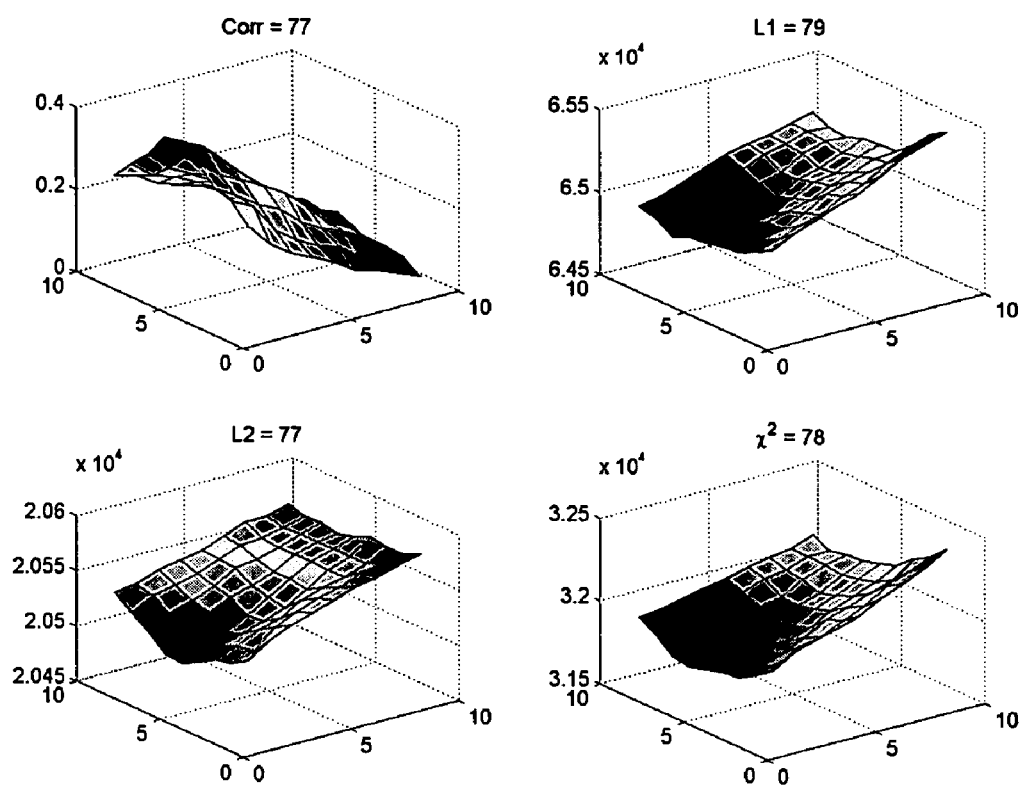
FIG. 3 is a diagram of exemplary match surfaces for a given image and the illuminant grid of FIG. 1.

FIG. 3 shows example match surfaces for a given image and the illuminant grid of FIG. 1 under different match metrics (correlation, L1, L2, and chi-squared). The index of the best match illuminant is also shown for each. Notice that correlation and L2 produce the identical selection, whereas L1 and chi-squared result in slightly different choices.

Algorithms of embodiments of the present invention may be implemented in software on a general-purpose computer or on a special-purpose computing device such as a DSP. Embodiments may also be implemented by dedicated circuitry such as an ASIC. Embodiment processes may be implemented in any image processing pipeline that outputs an image for display, for retrieval, for indexing or for other purposes.

The invention claimed is:

1. A method for estimating an image illuminant, the method comprising:

calculating color gamut models for a plurality of candidate illuminants;

generating an illuminant color gamut histogram for each of said color gamut models;
calculating an image color gamut;
generating an image color gamut histogram for said image color gamut;
determining a distance match metric for each of said candidate illuminants with reference to said image color gamut, wherein said distance match metric is related to the sum of the differences between corresponding illuminant color gamut histogram values and image color gamut histogram values; and
selecting an image illuminant from said plurality of candidate illuminants based on said distance match metric.

2. A method for estimating an image illuminant, the method comprising:
calculating color gamuts for a plurality of candidate illuminants;
generating candidate illuminant color gamut histograms for each of said plurality of candidate illuminants;
calculating a self-luminosity feature comprising a feature indicating the degree to which image elements are similar to self-luminous image elements or reflective image elements;
separating likely self-luminous image elements from likely reflective image elements;
calculating an image color gamut wherein said reflective image elements are considered differently than said self luminous image elements;
generating an image color gamut histogram based on said image color gamut;
determining a match metric for each of said candidate illuminants, wherein said match metric is related to the sum of the difference between corresponding values in said image color gamut histogram and said candidate illuminant color gamut histograms; and
selecting an image illuminant from said plurality of candidate illuminants based on said match metrics.

3. A method as described in claim 2 wherein calculating a self-luminosity feature comprises a binary value indicating that an element is reflective or self-luminous.

4. A method as described in claim 2 wherein said separating self-luminous image elements comprises determining the proximity of an image element to image boundaries.

5. A method as described in claim 2 wherein said calculating a self-luminosity feature comprises comparing the color characteristics of an image element to the color characteristics of reflective surfaces under a known illuminant.

6. A method as described in claim 2 wherein said calculating a self-luminosity feature comprises comparing the luminance characteristics of an image element to those of known self-luminous objects.

7. A method as described in claim 2 wherein said calculating an image chromaticity gamut is based solely on said reflective image elements.

8. A method as described in claim 2 wherein said calculating an image chromaticity gamut is based on a weighted distribution of said reflective image elements and said self-luminous image elements wherein said reflective image elements have a greater influence on said gamut.

9. A method as described in claim 1 wherein said determining a match metric comprises calculating a chi-squared statistic related to the variance of the image color gamut histogram relative to a candidate color gamut histogram.

10. A method for estimating an image illuminant, the method comprising:
calculating color gamuts for a plurality of candidate illuminants;
identifying image elements according to their likelihood of being self-luminous, wherein said identifying comprises determining a proximity of said image elements to an image boundary and said image elements are identified as more likely to be self-luminous when they are more proximate to an image boundary;
calculating an image color gamut from said image elements wherein said image elements that are more likely to be self luminous have a lower weight than image elements that are more likely to be reflective elements;
determining a match metric for matching a color gamut histogram for each of said candidate illuminants to a color gamut histogram for said image elements wherein said distance match metric is related to the sum of the differences between corresponding candidate illuminant color gamut histogram values and image color gamut histogram values; and
selecting an image illuminant from said plurality of candidate illuminants based on said match metric.

11. A method for estimating an image illuminant, the method comprising:
selecting a set of known illuminants;
establishing a color gamut for each of said known illuminants wherein said gamuts are represented by sample distribution histograms of color values for a set of color chips as rendered under each of said known illuminants;
estimating a weight value related to the probability that an image element in an image corresponds to a reflective surface;
establishing a color gamut histogram for said image wherein said weight value is used to increment an accumulator of a corresponding histogram bin;
computing a match metric between said image color gamut histogram and said known illuminant sample distribution histograms, wherein said match metric is related to the sum of the differences between said image color gamut histogram values and corresponding illuminant sample distribution histogram values; and
selecting an estimated image illuminant from among said set of known illuminants wherein said estimated image illuminant has the closest match to the image color gamut histogram.

12. A method as described in claim 11 wherein said estimating a weight value comprises using a function comprising element color values and two image position values.

13. A method as described in claim 11 wherein said computing a match metric comprises using a chi-squared statistic measuring the normalized squared difference between said image chromaticity histogram and said known illuminant color gamut histogram values.

14. A system for estimating an image illuminant, the system comprising:
a first calculator for calculating color gamuts for a plurality of candidate illuminants;
a first histogram generator for generating illuminant color gamut histograms;
a second calculator for calculating the degree to which an element is self-luminous;
a third calculator for calculating an image color gamut wherein said reflective image elements are considered differently than said self-luminous image elements;
a second histogram generator for generating an image color gamut histogram based on said image color gamut;

a matcher for determining a match metric for each of said candidate illuminants, wherein said match metric is based on the sum of the differences between values in said image color gamut histogram and corresponding values in said illuminant color gamut histograms; and a selector for selecting an image illuminant from said plurality of candidate illuminants based on said match metric.

15. A computer-readable medium comprising a set of computer-executable instructions for estimating an illuminant of an image, said instructions comprising the acts of:

calculating color gamuts for a plurality of candidate illuminants;

generating illuminant color gamut histograms corresponding to said illuminant color gamuts;

calculating a self-luminosity feature that estimates the degree to which an element is self-luminous;

calculating an image color gamut wherein said reflective image elements are considered differently than said self-luminous image elements;

generating an image color gamut histogram based on said image color gamut;

determining a match metric for each of said candidate illuminants, wherein said match metric is based on the sum of the differences between said values in said image color gamut histogram and corresponding values in said illuminant color gamut histograms; and selecting an image illuminant from said plurality of candidate illuminants based on said match metric.

* * * * *